United States Patent [19]
Lee

[11] Patent Number: 5,602,685
[45] Date of Patent: Feb. 11, 1997

[54] METHOD AND APPARATUS FOR INTERLEAVING DATA IN A DIGITAL RECORDING SYSTEM

[75] Inventor: Sang-rak Lee, Suwon, Rep. of Korea

[73] Assignee: Samsung Electronics Co., Ltd., Kyungki-do, Rep. of Korea

[21] Appl. No.: 388,306

[22] Filed: Feb. 14, 1995

[30] Foreign Application Priority Data

Apr. 21, 1994 [KR] Rep. of Korea ............... 94-8442

[51] Int. Cl.$^6$ ............................................. H04N 5/78
[52] U.S. Cl. .................. 386/47; 360/32; 360/48; 360/53; 386/2; 386/40; 386/124
[58] Field of Search ............ 360/38.1, 32, 33.1, 360/48, 53; 371/2.1; 358/335, 336, 310, 314

[56] References Cited

U.S. PATENT DOCUMENTS

| | | | |
|---|---|---|---|
| 4,277,807 | 7/1981 | Baldwin | 360/32 |
| 4,563,710 | 1/1986 | Baldwin | 360/19.1 |
| 5,146,325 | 9/1992 | Ng | 348/384 |
| 5,148,272 | 9/1992 | Acampora | 348/397 |
| 5,168,356 | 12/1992 | Acampora | 348/409 |
| 5,212,549 | 5/1993 | Ng | 348/409 |
| 5,289,322 | 2/1994 | Higashida et al. | 360/32 |
| 5,374,958 | 12/1994 | Yanagihara | 348/405 |
| 5,455,629 | 10/1995 | Sun | 348/466 |
| 5,461,486 | 10/1995 | Uchida | 360/32 |

FOREIGN PATENT DOCUMENTS

23310   2/1983   Japan ............... 360/32

*Primary Examiner*—Aristotelis Psitos
*Assistant Examiner*—Alan Faber
*Attorney, Agent, or Firm*—Sughrue, Mion, Zinn, Macpeak & Seas

[57] ABSTRACT

A data interleaving method for a digital recording system providing increased error correction capacity includes steps for determining a moduli number (NMod) in accordance with the number of fields per frame and the number of segments per field, assigning a number from zero to NMod−1 for each track, determining macro-blocks to be recorded on each track in accordance with a remainder value obtained by dividing a macro-block number assigned to each macro-block by the moduli number, and the number assigned to the each track paired with recording the data for respective macro-blocks determined for each track. A corresponding apparatus adapted to perform the above-described method is also described. The method and apparatus advantageously increase the error correction capacity of respective error correction codes.

6 Claims, 7 Drawing Sheets

FIG. 7

METHOD AND APPARATUS FOR INTERLEAVING DATA IN A DIGITAL RECORDING SYSTEM

BACKGROUND OF THE INVENTION

1. Field of the Invention

The present invention relates to a data interleaving method and, more specifically, to a data interleaving method which raises the error correction capacity in a digital recording system. The method is particularly advantageous when employed in operating a system such as a digital video cassette recorder (DVCR). A corresponding apparatus is also disclosed.

2. Discussion of Related Art

In a DVCR system, the common method for promoting error correction capacity is called interleaving, whereby burst errors may be changed into random errors. In a DVCR system which does not perform data compression, i.e., a broadcasting DVCR system using D-2 or D-3 recording formats, the data correction capacity of the system is raised using a shuffling process. However, since a DVCR applying data compression cannot perform the shuffling process well, these DVCRs exhibit very poor protection against burst errors. Moreover, error propagation problems arise in systems applying data compression when the burst errors are of a magnitude exceeding the correction capacity of the respective decoder of the system, e.g., the DVCR.

Figure 1:
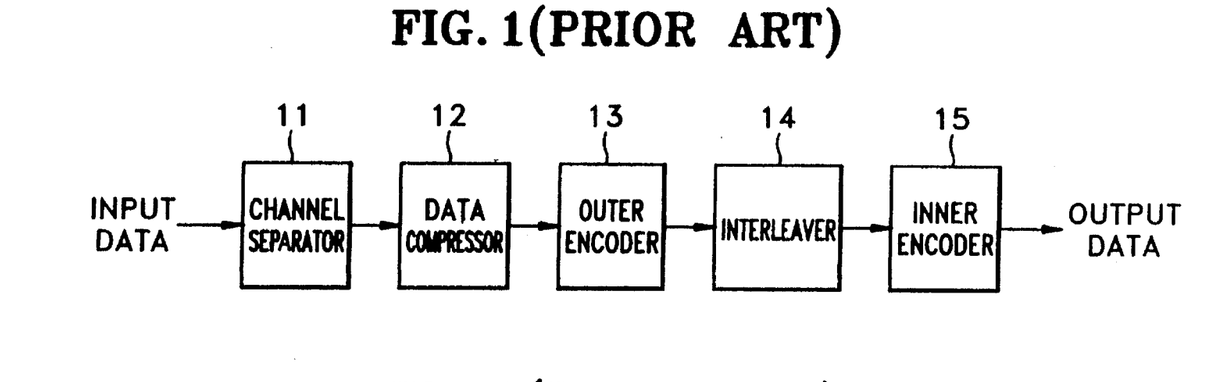
FIG. 1 shows a block diagram of a prior-art digital recording system.

FIG. 1 is a block diagram of a conventional data compressing and error correction encoding apparatus. A channel separator 11 separates and outputs input data in a plurality of channels. A data compressor 12 compresses the output digital data using a known data compression technique to produce compressed data and an outer encoder 13 adds outer vertical parities to each column of the compressed data. An interleaver 14 performs a "shuffling" function on the data to which the outer vertical parities were added in outer encoder 13, thus providing shuffled data. Inner horizontal parities are added to each row of the shuffled data by an inner encoder 15.

In a system to which data compression is not employed, data pixels are evenly scattered and recorded in various channels. Thus, even though data of a particular channel are damaged, the data of the damaged channel can be restored with data of the other channels using a "data concealment" technique. However, since a system to which data compression is applied has to consider the efficiency of data compression technique, such a system may not use the above-mentioned channel division method, and instead applies the so-called plane division method. It will be noted that when all the data for a particular channel becomes damaged in systems using the plane division error concealment technique, the applied technique may result in destroying all the data of the macro-blocks of a particular image.

Figure 2:
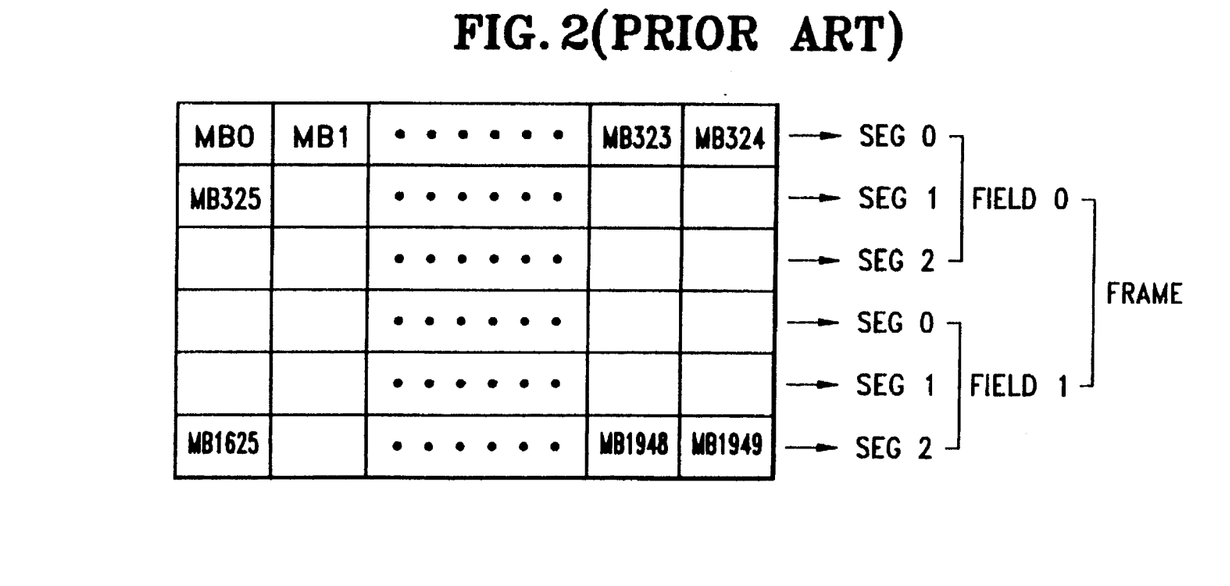
FIG. 2 is a drawing illustrating a prior-art sequential segment division method for one frame signal.

A conventional sequential segment division method for one frame signal is illustrated in FIG. 2, wherein one frame signal, for example, consists of two fields of three segments each, i.e., six segments.

Figure 3:
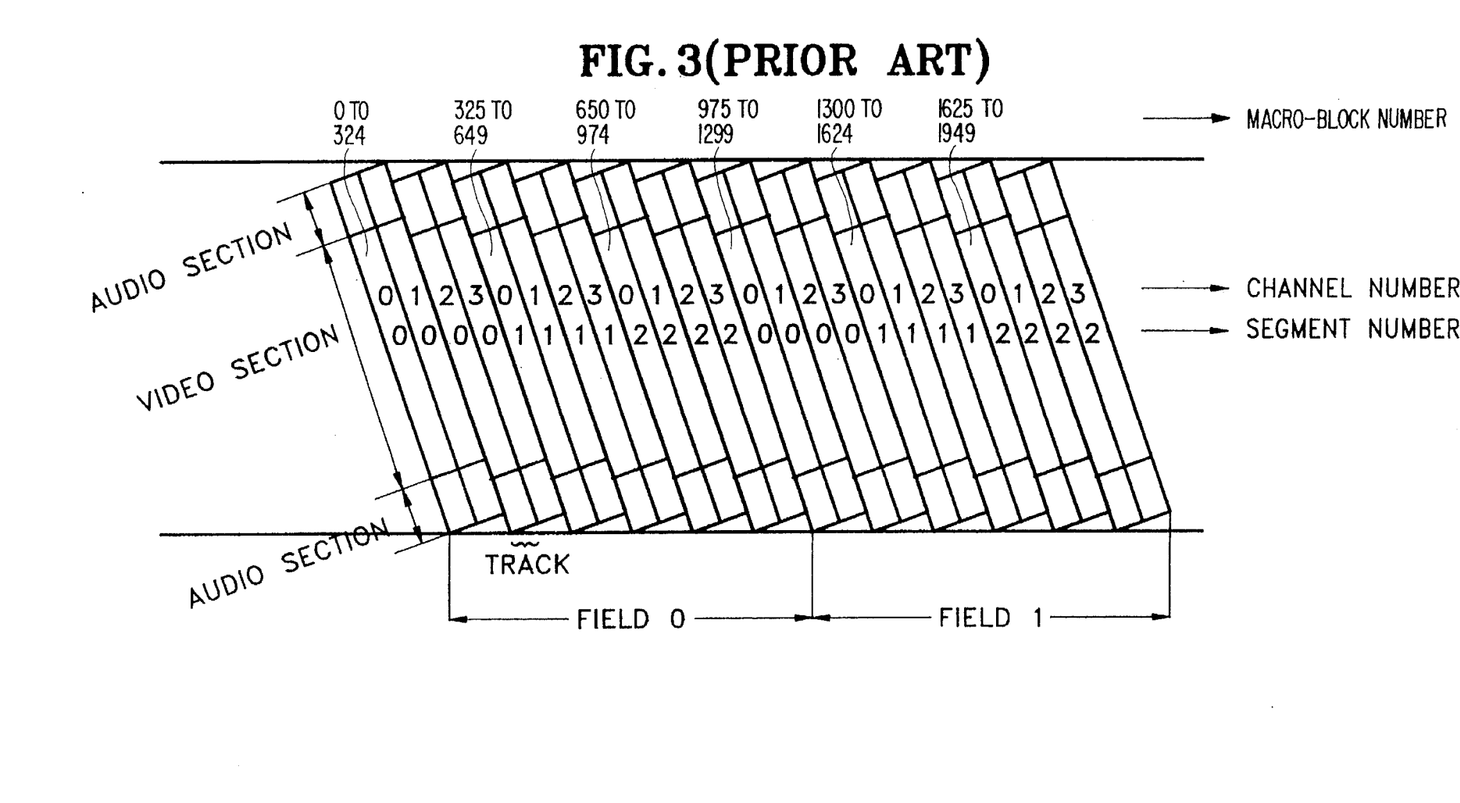
FIG. 3 shows a prior-art data pattern which is recorded on a plurality of tape tracks.

FIG. 3 shows a conventional data recording pattern for a tape recording data on a plurality of tracks. One frame signal is sequentially recorded on adjacent tracks on a tape, following the order of an assigned macro-block number and according to a field number, a channel number and a segment number, which are acquired by applying the segment division method depicted in FIG. 2. From FIG. 3 it will be noted that macro-blocks 0–324 for channels 1–4, which correspond to field 0 and segment 0, are recorded on tracks 1–4, macro-blocks 325–649 for channels 1–4, which correspond to field 0 and segment 1, are recorded on tracks 5–8, and macro-blocks 650–974 for channels 1–4, which correspond to field 0 and segment 2, are recorded on tracks 9–12. In the same way, the other macro-blocks are sequentially recorded in numerical order based on the segment number and the channel number in units of four tracks.

Figure 4:
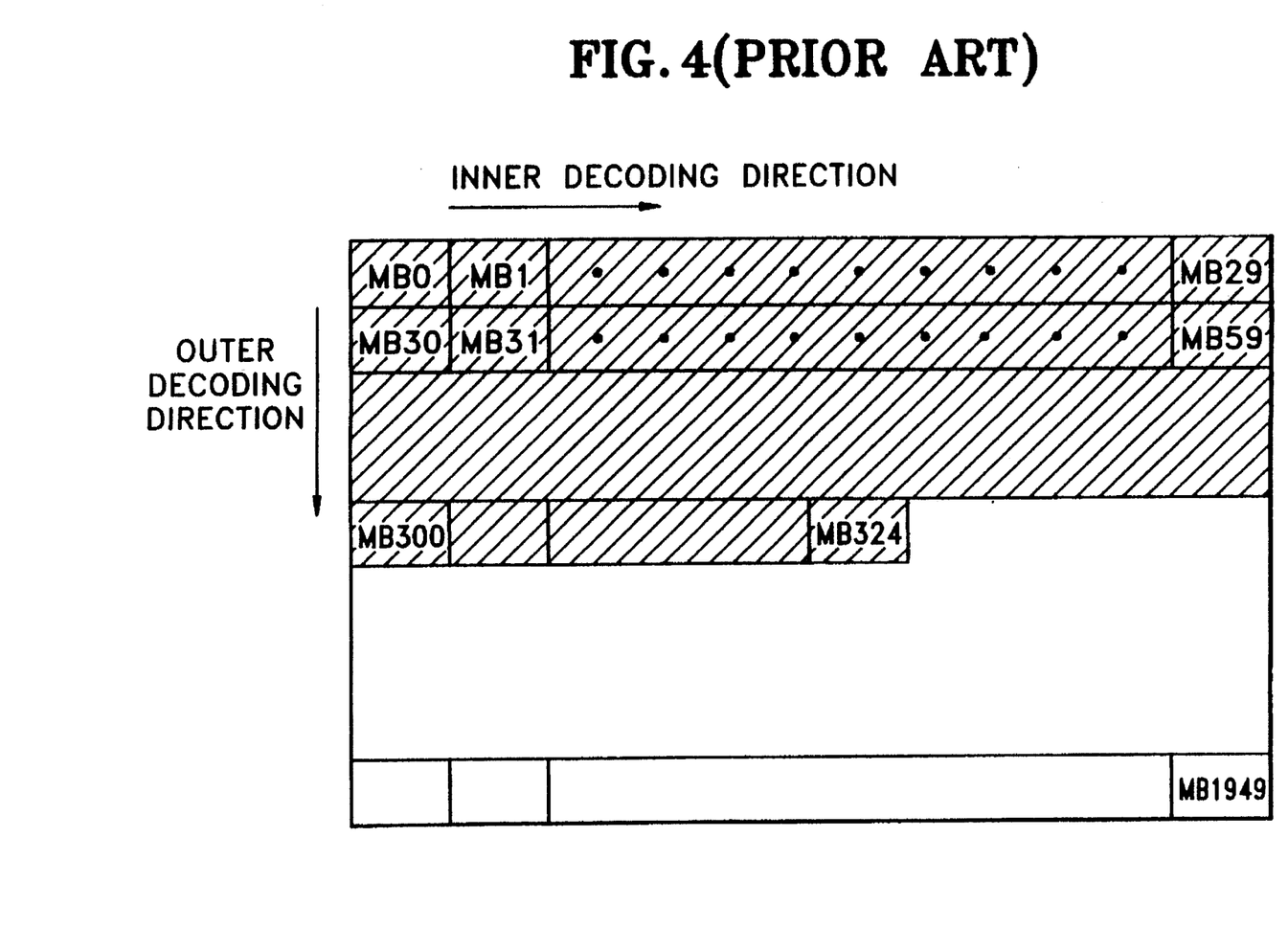
FIG. 4 shows a data format of an error correction coding for the case wherein all of the data of one track is destroyed for the recording pattern shown in FIG. 3.

FIG. 4 shows a data format of an error correction code in an exemplary case where data is recorded on track 1. In FIG. 4, the macro-block data corresponding to field 0, channel 0 and segment 0, becomes damaged. FIG. 4 shows that macro-blocks MB0–MB324, denoted by hatch marks, include damaged data, wherein the data of the error correction code may include burst errors.

Therefore, as described above, if the segments are sequentially assigned according to macro-block number order, and macro-blocks which are included in the assigned segment are recorded on one track, it is nearly impossible to restore data when burst errors occur or when all of the data for a particular channel is damaged. In other words, the destruction of the data representing one whole track results in raising the burden for error correction accomplished by an inner decoding device. Accordingly, an error occurring in two whole tracks results in exceeding the error correction capacity of an outer decoding device.

SUMMARY OF THE INVENTION

An object of the present invention is to provide a data interleaving method in a digital recording system for increasing the error correction capacity of an error correction code against burst errors.

Another object of the present invention is to provide a data interleaving apparatus for a digital recording system for increasing the error correction capacity of an error correction code against burst errors.

These and other objects, features and advantages according to the present invention are provided by a data interleaving method interleaving data so as to record a plurality of frame signals on a recording media using a plurality of adjacent tracks in a digital recording system, wherein each frame signal includes a predetermined number of channel signals, and wherein each frame signal is divided into a predetermined number of fields, each field signal being subsequently divided into a predetermined number of segments. The method includes sequential steps for determining a moduli number based on a number of fields per frame and a number of segments per field, assigning a number ranging from zero to the moduli number minus one (NMod−1) to each respective track, determining a plurality of macro-blocks which are to be recorded on each track in accordance with a remainder value obtained by dividing the respective macro-block number for each macro-block by the determined moduli number, and recording the data of macro-blocks determined for each track according to the remainder of the division.

These and other objects, features and advantages according to the present invention are provided by a data interleaving apparatus interleaving data for subsequent recording of a plurality of frame signals on a recording media on tracks in a digital recording system, wherein each frame signal includes a predetermined number of channel signals, and wherein each frame signal is divided into a predetermined number of fields, each field signal divided into a predetermined number of segments. The interleaving apparatus according to the present invention may advantageously include a storage device acting as means for storing an input frame signal, a track information generating device acting as means for generating a frame number, a field number, a channel number and a segment number for each track, a track modulus number generator acting as generating means for determining a moduli number in accordance with the number of fields per frame and the number of segments per field, thereby generating a modulus number for each track by assigning a number from 0 to the moduli number minus one (NMOD−1) in accordance with the frame number, the field number, the channel number and the segment number for each track, and an address generating device acting as means for generating addresses to store input frame signals in the storage means, and for generating addresses to read macro-block data having a modulus number matching the assigned modulus number of each track from the storage device, so as to permit read out and recording of stored data on a corresponding track. According to one aspect of the present invention, the assigned modulus number for respective macro-blocks is determined as a remainder value obtained by dividing a macro-block number by the moduli number.

BRIEF DESCRIPTION OF THE DRAWINGS

The above objects and advantages of the present invention will become more apparent from the following detailed description with reference to the attached drawings in which.

DETAILED DESCRIPTION OF THE PREFERRED EMBODIMENTS

Figure 5:
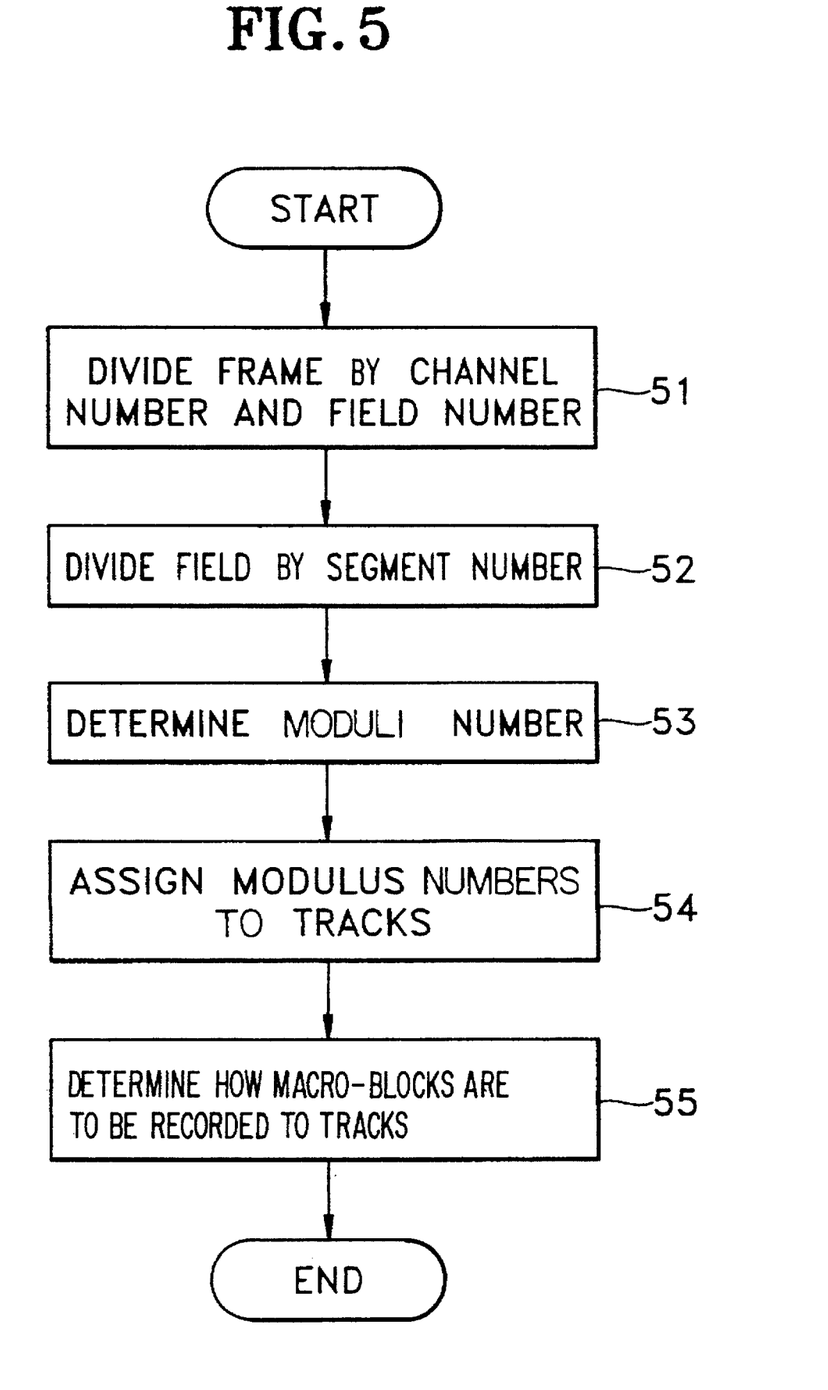
FIG. 5 is a flow chart of a data interleaving method according to the present invention.

A flow chart illustrating the data interleaving method according to the present invention is shown in FIG. 5, wherein one frame signal is first divided into a predetermined number of channels and a predetermined number of fields in Step 51. During Step 52, each of the fields is divided into a predetermined number of segments. In an exemplary case, one frame signal is divided into two field signals and one field signal is subsequently divided into three segments. During Step 53, a moduli number is determined according to the predetermined number of fields per frame and the predetermined number of segments per field, as shown in equation (1):

$$NMod = NF \times NSg \qquad (1)$$

wherein NMod is the moduli number, NF is the number of fields per frame, and NSg is the number of segments per field. The moduli number is six in the exemplary case under discussion.

Then, one number for each of the tracks, which number is an integer in the range from zero to the moduli number minus one, i.e., (NMod−1), is selected as a modulus number for each respective track. The modulus number is determined in accordance with the frame number, the field number, the segment number and the channel number which are sequentially assigned to the respective track during Step 54. The modulus number selected for the respective track advantageously can be determined as the remainder value obtained by dividing the value calculated by means of the following expression (2) by the moduli number.

$$\text{Calculated Value} = (Nsg \times Fd) + Fr + Ch + Sg \qquad (2)$$

In the above expression, NSg is the number of segments per field, Fd is the field number for the track, Fr is the frame number for the track, Ch is the channel number for the track, and Sg is the segment number for the track.

Data to be recorded on a track is determined as data representing macro-blocks, whose assigned macro-block number is such that a remainder value after division of the macro-block number by the moduli number is equal to the modulus number assigned to the track during Step 55.

TABLE 1

| frame number | channel number | field number 0 | | | field number 1 | | |
|---|---|---|---|---|---|---|---|
| | | SEG 0 | SEG 1 | SEG 2 | SEG 0 | SEG 1 | SEG 2 |
| 0 | 0 | Mod 0 | Mod 1 | Mod 2 | Mod 3 | Mod 4 | Mod 5 |
| | 1 | Mod 1 | Mod 2 | Mod 3 | Mod 4 | Mod 5 | Mod 0 |
| | 2 | Mod 2 | Mod 3 | Mod 4 | Mod 5 | Mod 0 | Mod 1 |
| | 3 | Mod 3 | Mod 4 | Mod 5 | Mod 0 | Mod 1 | Mod 2 |
| 1 | 0 | Mod 1 | Mod 2 | Mod 3 | Mod 4 | Mod 5 | Mod 0 |
| | 1 | Mod 2 | Mod 3 | Mod 4 | Mod 5 | Mod 0 | Mod 1 |
| | 2 | Mod 3 | Mod 4 | Mod 5 | Mod 0 | Mod 1 | Mod 2 |
| | 3 | Mod 4 | Mod 5 | Mod 0 | Mod 1 | Mod 2 | Mod 3 |
| 2 | 0 | Mod 2 | Mod 3 | Mod 4 | Mod 5 | Mod 0 | Mod 1 |
| | 1 | Mod 3 | Mod 4 | Mod 5 | Mod 0 | Mod 1 | Mod 2 |
| | 2 | Mod 4 | Mod 5 | Mod 0 | Mod 1 | Mod 2 | Mod 3 |
| | 3 | Mod 5 | Mod 0 | Mod 1 | Mod 2 | Mod 3 | Mod 4 |
| 3 | 0 | Mod 3 | Mod 4 | Mod 5 | Mod 0 | Mod 1 | Mod 2 |
| | 1 | Mod 4 | Mod 5 | Mod 0 | Mod 1 | Mod 2 | Mod 3 |
| | 2 | Mod 5 | Mod 0 | Mod 1 | Mod 2 | Mod 3 | Mod 4 |
| | 3 | Mod 0 | Mod 1 | Mod 2 | Mod 3 | Mod 4 | Mod 5 |

TABLE 1 shows a modulus number of the macro-blocks to be recorded by tracks, according to track information such as the frame number, the channel number, the field number and the segment number for each track. The modulus number for each macro-block is determined as the remainder value which is obtained by dividing the macro-block number by the corresponding moduli number. For example, in the exemplary case wherein the moduli number is six, the macro-block numbers corresponding to "modulus 0" are zero, six, and twelve, and macro-block numbers corresponding to "modulus 1" are one, seven and thirteen. It will be readily appreciated that macro-block numbers corresponding to "modulus 2," "modulus 3" etc., are determined in the same manner. Here, the modulus number selected by tracks can be determined as described above.

Figure 6:
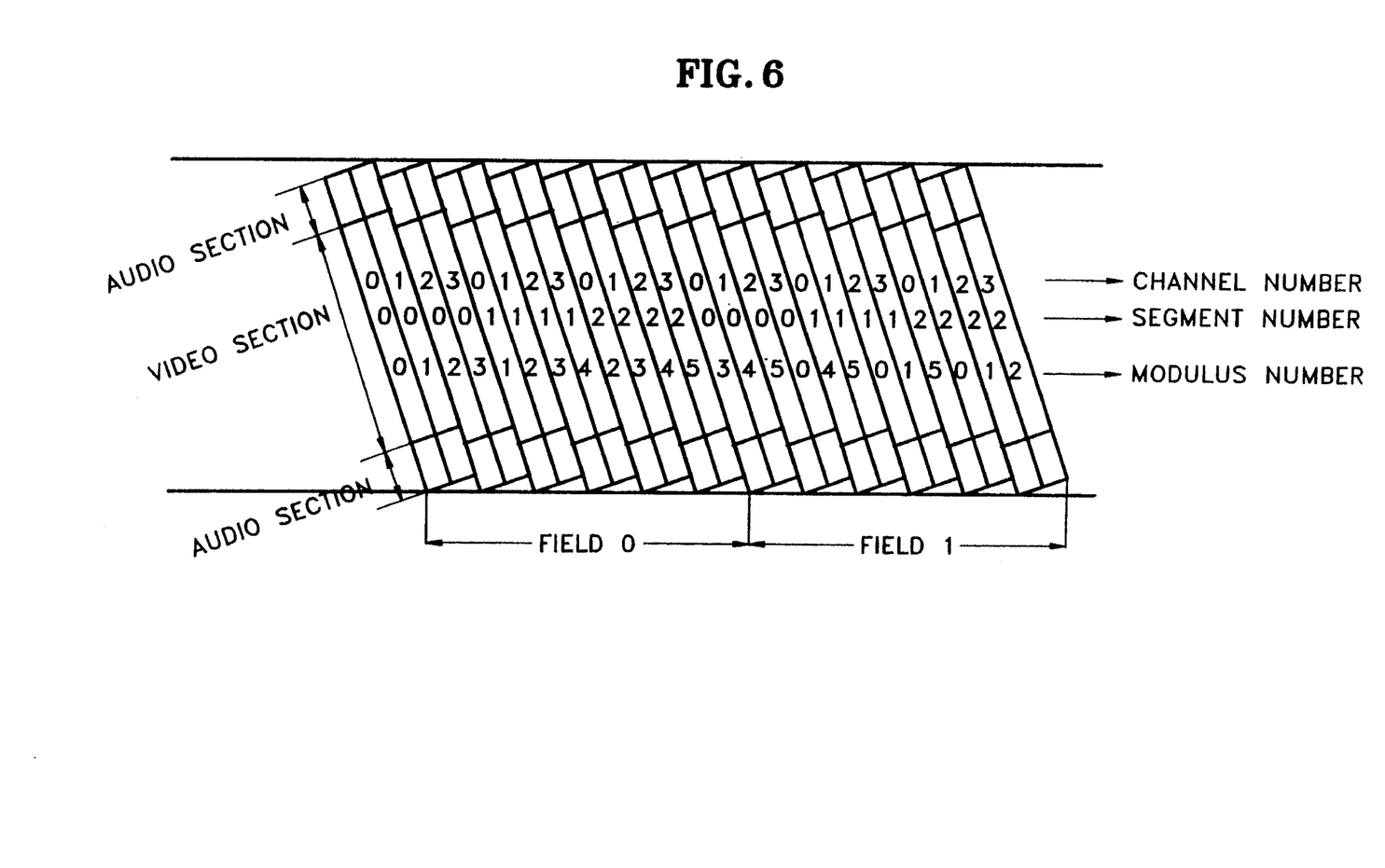
FIG. 6 shows a data pattern which is recorded on a plurality of tape tracks according to a preferred embodiment of the present invention.

The data pattern recorded on tape tracks for one frame signal, according to a preferred embodiment of the present invention, is illustrated in FIG. 6. Macro-blocks which have a macro-block number which produces a remainder corresponding to the assigned modulus number determined according to the frame number, the field number, the channel number and the segment number by tracks, as described in expression (2) and depicted in Table 1, are recorded on each track. For example, macro-blocks which correspond to "modulus 0" are recorded on "track 1" which corresponds to "frame 0," "field 0," "segment 0" and "channel 0," and macro-blocks which correspond to "modulus 1" are recorded on "track 2" which corresponds to "frame 0," "field 0," "segment 0" and "channel 1."

Figure 7:
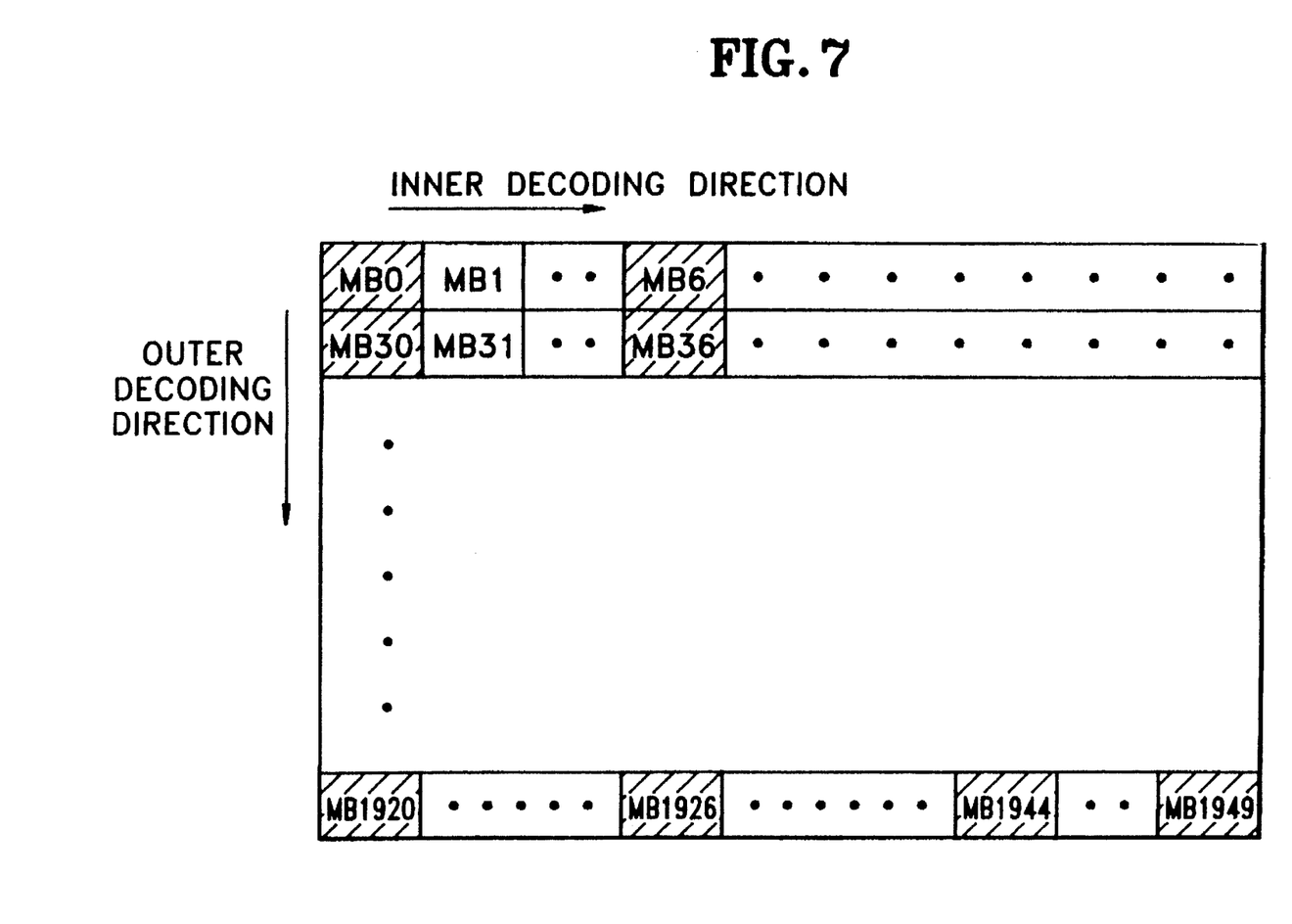
FIG. 7 shows a data format of an error correction coding for the exemplary case wherein all of the data for one track is destroyed for the recording pattern shown in FIG. 6.

FIG. 7 illustrates the data format of an error correction coding for the exemplary case wherein the data recorded in "track 1," i.e., data corresponding to "field 0, ... channel 0, ... segment 0" and "modulus 0," is wholly damaged and is recorded using the recording pattern shown in FIG. 6. In the drawing, the hatched portions of the drawing (MB0, MB6, ..., MB30, ..., MB1944, MB1949) represent macro-blocks which correspond to destroyed data. As shown in FIG. 7, even though errors occur in macro-blocks which are recorded on one track, during reproduction the destroyed macro-blocks are randomly located during error correction decoding. Accordingly, error correction capacity during inner-decoding is promoted. Consequently, error correction capacity during outer-decoding is also promoted.

Figure 8:
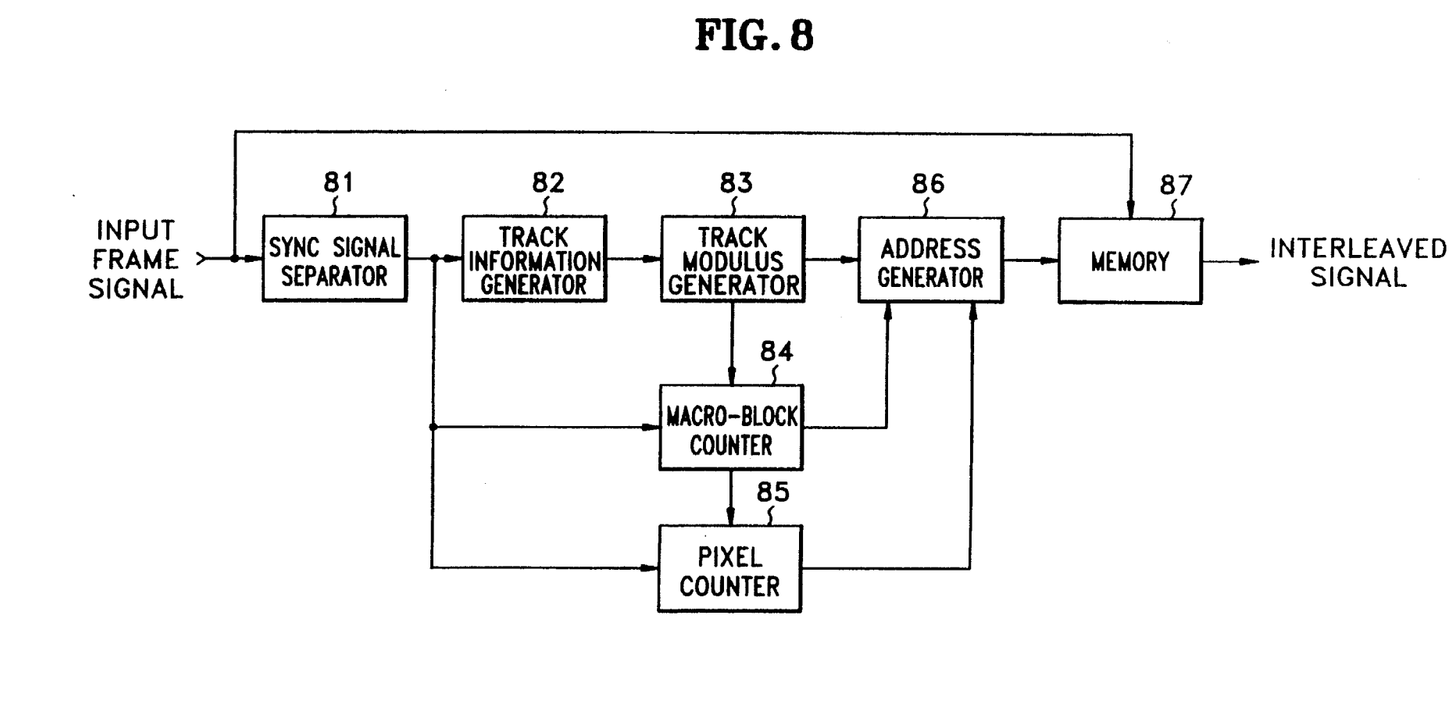
FIG. 8 is a block diagram of a data interleaving apparatus according to a preferred embodiment of the present invention.

FIG. 8 is a block diagram of the data interleaving apparatus according to another preferred embodiment of the present invention. The apparatus preferably includes a sync signal separator 81 serially connected to a track information generator 82, a track modulus number generator 83 connected to generator 82, a macro-block counter 84 receiving the modulus number, a pixel counter 85 receiving the macro-block count, an address generator 86 receiving the modulus number, the macro-block count and the pixel count and a memory 87 receiving the input frame signal and various addresses from address generator 86.

Input frame signal is supplied to the sync signal separator 81 and the memory 87. Sync signal separator 81 separates a sync signal from the input frame signal, which sync signal includes horizontal, vertical and composite sync signals functioning as reference signals for track information generator 82, macro-block counter 84 and pixel counter 85. Track information generator 82 generates track information such as a frame number, a channel number, a field number and a segment number for tracks on which data will be recorded and supplies the track information to track modulus number generator 83. Track modulus number generator 83 determines a moduli number according to the number of fields per frame and the number of segments per field, assigns a modulus number from 0 to NMod−1 to each track, as shown in Table 1, according to the frame number, the field number, the channel number and the segment number of the track, which advantageously are generated by track information generator 82, and supplies the assigned modulus number to address generator 86 as the modulus number of the corresponding track.

Macro-block counter 84 counts the number of macro-blocks which are recorded on one track. Pixel counter 85 counts the number of pixels in each macro-block. Thereafter, the counted numbers are output to address generator 86. Address generator 86 generates addresses for writing the input frame signal into memory 87, and generates addresses for reading from memory 87 the data of macro-blocks having a modulus number identical to the assigned modulus number for each track. It will be appreciated from the discussion above that the addresses are calculated in accordance with the modulus number supplied from track modulus number generator 83, the block count number supplied from macro-block counter 84, and the pixel count number supplied from pixel counter 85. Preferably, the modulus number for each macro-block is determined as the remainder value obtained by dividing the macro-block number by the moduli number. Memory 87 advantageously stores one frame signal and outputs the interleaved data to be recorded by tracks under the control of address generator 86.

In the present invention as described above, macro-blocks of one frame signal are not sequentially recorded on one track but are more randomly recorded on several tracks by using an assigned modulus number for each macro-block. Thus, any destroyed or damaged macro-blocks are randomly located during error correction coding, allowing data recovery, in spite of the occurrence of burst errors in a track, during reproduction. Therefore, error correction capacity of error correction coding can be improved.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A data interleaving method for interleaving data to permit recording of a plurality of frame signals on each track on a recording medium in a digital recording system, wherein each said frame signal includes a predetermined number of channel signals, and wherein each said frame signal is divided into a predetermined number of fields, with each said field being divided into a predetermined number of segments, said method comprising the steps of:

determining a moduli number in accordance with said number of fields per frame and said number of segments per field;

assigning an integer, ranging from zero to the moduli number minus one, to each said track determining for each of a plurality of macro-blocks, corresponding to each said frame signal and each having a macro-block number, which track said macro-block should be recorded on, said determining step further comprising the steps of:

dividing the corresponding macro-block number by the moduli number to obtain a remainder value;

pairing said remainder value with an integer assigned to at least one of said tracks during said assigning step; and recording data of each macro-block on at least one of said plurality of tracks in accordance with the pairing in said determining step.

2. The data interleaving method as claimed in claim 1, wherein said moduli number is obtained by multiplying said number of fields per frame by said number of segments per field.

3. The data interleaving method as claimed in claim 1, wherein said assigned integer for each track corresponds to a remainder value obtained by dividing a calculated value by said moduli number, wherein said calculated value is determined by the expression:

$$\text{Calculated value} = (NSg \times Fd) + Fr + Ch + Sg,$$

where NSg is the predetermined number of segments per fields, Fd is the field number for the respective track, Fr is the frame number for the respective track, Ch is the channel number for the respective track, and Sg is the segment number for the respective track.

4. A data interleaving apparatus for interleaving data to permit recording of a plurality of frame signals on a recording medium using a plurality of tracks in a digital recording system, wherein each said frame signal includes a predetermined number of channel signals, and wherein each said frame signal is divided into a predetermined number of fields, each said field being divided into a predetermined number of segments, said data interleaving apparatus comprising:

storage means for storing an input frame signal;

track information generating means for generating a frame number, a field number, a channel number and a segment number for each said track;

track modulus integer generating means for determining a moduli number in accordance with said number of fields per frame and said number of segments per field, and for generating a modulus integer for each said track by assigning a number from zero to the moduli number minus one in accordance with said frame number, said field number, said channel number and said segment number for each said track; and an address generating means for generating input addresses to permit storage of said input frame signal in said storage means, and for generating output addresses to permit read out and recording of a plurality of macro-blocks of data, each having a macro-block number and corresponding to said plurality of frame signals, said address generating means further comprising a pairing means for pairing each said macro-block with at least one of said tracks based on the modulus integer of said track and a remainder value of said macro-block, said remainder value being obtained by dividing the macro-block number by the moduli number.

5. The data interleaving apparatus as claimed in claim 4, further comprising:

sync separator means for receiving said input frame signal and for recovering and providing a sync signal from said input frame signal, wherein said track information generating means is serially connected to said sync separating means.

6. The data interleaving apparatus as claimed in claim 5, further comprising:

macro block counter means for receiving said moduli number from said track modulus integer generating means and for determining a count of said macro-blocks to produce a block count number; and pixel counting means for receiving said block count number and for producing a pixel count number for each said macro-block;

wherein said macro-block counter means and said pixel block counter means are serially connected with said sync signal separator, and wherein said address generating means is connected to receive said block count number and said pixel count number.

* * * * *